United States Patent
Burri

(10) Patent No.: US 9,498,833 B2
(45) Date of Patent: Nov. 22, 2016

(54) MACHINE TOOL FOR THE PRODUCTION OF PROFILES

(71) Applicant: BURRI Werkzeugmaschinen GmbH & Co. KG, Villingendorf (DE)

(72) Inventor: Dieter Burri, Bosingen (DE)

(73) Assignee: BURRI Werkzeugmaschinen GmbH & Co. KG, Villengendorf (DE)

( * ) Notice: Subject to any disclaimer, the term of this patent is extended or adjusted under 35 U.S.C. 154(b) by 427 days.

(21) Appl. No.: 14/076,124

(22) Filed: Nov. 8, 2013

(65) Prior Publication Data

US 2014/0130320 A1    May 15, 2014

(30) Foreign Application Priority Data

Nov. 14, 2012  (EP) .................................. 12401231

(51) Int. Cl.
*B23F 23/12*    (2006.01)
*B23F 17/00*    (2006.01)
(Continued)

(52) U.S. Cl.
CPC ............ *B23F 17/006* (2013.01); *B23F 1/02* (2013.01); *B23F 1/06* (2013.01); *B23F 5/04* (2013.01); *B23F 5/22* (2013.01); *B23F 23/1225* (2013.01); *B23Q 39/028* (2013.01); *B24B 53/062* (2013.01); *Y10T 29/5176* (2015.01); *Y10T 409/10159* (2015.01); *Y10T 409/103657* (2015.01); *Y10T 409/20* (2015.01)

(58) Field of Classification Search
CPC ............ B23F 1/02; B23F 1/023; B23F 1/06; B23F 5/02; B23F 5/04; B23F 23/1225; B23Q 39/028; B23Q 39/029; B24B 53/06; B24B 53/062; Y10T 409/10159; Y10T 409/101749; Y10T 409/102067; Y10T 409/20

USPC ....... 409/11, 12, 14, 63; 451/56, 72; 29/56.5
See application file for complete search history.

(56) References Cited

U.S. PATENT DOCUMENTS 4,850,155 A * 7/1989 Sulzer .................. B23F 21/026
                                                        451/148
4,961,289 A    10/1990 Sulzer
(Continued)

FOREIGN PATENT DOCUMENTS

DE    202005020088 U1    4/2006
DE    102009048416 B3    5/2011
(Continued)

OTHER PUBLICATIONS

English Translation of JP 2002103139 A (Komatus Mfg Co. Ltd.).

*Primary Examiner* — Erica E Cadugan
*Assistant Examiner* — Michael Vitale
(74) *Attorney, Agent, or Firm* — Charles H Jew

(57) ABSTRACT

Machine tool for the production of profiles, such as gearing systems on a workpiece, by means of a rotoncally driven machining tool by generating grinding, profile grinding, generating milling and/or profile milling, having at least one workpiece receiving device, a workpiece machining device and an optional machining tool profiling device. According to the invention, the workpiece machining device is borne by a machine base that has a tangential carriage, a radial carriage, a lifting carriage and a rotational carriage. With this specific construction, the workpiece machining device is guided moveably in all spatial directions with respect to the workpiece receiving device and also, if available, with respect to the machining tool profiling device.

16 Claims, 3 Drawing Sheets

(51) Int. Cl.
*B24B 53/06* (2006.01)
*B23Q 39/02* (2006.01)
*B23F 1/02* (2006.01)
*B23F 1/06* (2006.01)
*B23F 5/04* (2006.01)
*B23F 5/22* (2006.01)

(56) References Cited

U.S. PATENT DOCUMENTS

| | | | |
|---|---|---|---|
| 5,379,554 A * | 1/1995 | Thurman | B23F 21/026 451/177 |
| 5,765,974 A * | 6/1998 | Faulstich | B23F 17/00 409/38 |
| 7,198,543 B2 * | 4/2007 | Yanase | B24B 53/085 451/21 |
| 2003/0113177 A1 | 6/2003 | Fahrer et al. | |
| 2006/0174464 A1 * | 8/2006 | Fitzgerald | B23C 3/12 29/56.5 |
| 2009/0227182 A1 * | 9/2009 | Breith | B23F 23/1225 451/5 |
| 2010/0304642 A1 | 12/2010 | Mundt | |
| 2011/0268522 A1 | 11/2011 | Ochi et al. | |
| 2012/0189395 A1 * | 7/2012 | Affaticati | B23F 1/065 409/10 |
| 2012/0225614 A1 | 9/2012 | Ochi et al. | |

FOREIGN PATENT DOCUMENTS

| | | | |
|---|---|---|---|
| EP | 2029306 B1 | 4/2011 | |
| EP | 1992439 B1 | 7/2011 | |
| EP | 2397249 A1 | 12/2011 | |
| IT | WO 2011010210 A1 * | 1/2011 | B23F 5/02 |
| JP | 2002103139 A | 4/2002 | |
| WO | 2011121822 A1 | 10/2011 | |
| WO | 2012032941 A1 | 3/2012 | |

* cited by examiner

MACHINE TOOL FOR THE PRODUCTION OF PROFILES

The invention relates to a machine tool for the production of profiles on a workpiece by means of a rotorically driven machining tool by generating grinding, profile grinding, generating milling and/or profile milling, having a machine bed that has at least one workpiece receiving device, which can be rotated around an axis of rotation, for tightening the workpiece, and a workpiece machining device for machining the workpiece that holds and drives the machining tool, wherein the workpiece receiving device is arranged as stationary and the workpiece machining device is arranged moveably on the machine bed, and wherein the workpiece machining device is borne by a machine base, which has a radial carriage that can be displaced radially perpendicular to the axis of rotation of the workpiece receiving device, and a displaceable lifting carriage that is arranged on the radial carriage parallel to the axis of rotation of the workpiece receiving device, on which a rotational carriage that can be rotated with respect to the lifting carriage is arranged, which extends parallel to the axis of rotation of the workpiece receiving device and which bears the workpiece machining device rotatably, wherein the machine base has a sliding carriage that moveably bears the radial carriage and wherein the machine bed has a machine base linear dual guide for the sliding carriage, which guides the machine base moveably opposite the workpiece receiving device. In this context, gearing systems are in particular understood as profiles.

Such machines for the production of profiles, in particular gearing systems, in particular for grinding or milling tooth flanks, are known in manifold embodiments from the prior art. The machining of the workpiece takes place by a relative movement of the machining tool with respect to the workpiece, wherein the workpiece machining device having the grinding or milling tool can be moved in two spatial directions by means of the radial carriage and the lifting carriage and the gearing angle can be adjusted by means of the rotational carriage. These machines are typically operated with dressable machining tools, which are newly dressed after the machining of a specific number of workpieces by means of a machining tool profiling device in order to reproduce the original cutting ability and the target profile of the machining tool. This occurs with a fixed or rotating dressing tool of the machining tool profiling device.

In many known machine tools that conform to their genre, the machining tool profiling device is arranged close to or away from the workpiece receiving device in such a way that the machine axes provided for the machining of the workpiece cannot typically be used for the dressing. Instead, the relative lifting and/or in-feed movement of the dressing tool and the machining tool of motion axes of the machine allocated to exactly this function must be generated. These motion axes can thus be provided on the machining tool profiling device and/or on the workpiece machining device. The additional motion axes lead to a relatively complicated and cost-intensive construction of such machines. An additional disadvantage is that the dressing tool is mostly relatively poorly accessible, whereby the setup work is then made unnecessarily more difficult.

The gear grinding machines known from the prior art in particular all have highly elaborate constructions for bringing the machining tool profiling device, with respect to the workpiece machining device or vice versa, the workpiece machining device with respect to machining tool profiling device, into the operating position for the dressing of the machining tool by means of the dressing tooling of the machining tool profiling device. Multi-spindle workpiece axes, i.e. machines having at least two workpiece receiving devices, are also known in gear milling and grinding machines to save setup time. While one of the spindles is in the operating position, the other spindle is loaded. These workpiece receiving devices are mainly integrated into a rotary table. Such constructions are likewise, in part, highly elaborate and also expensive. To that end, reference is made by way of example to documents EP 2 397 249 A1, WO 2012/032941 A1, EP 1 992 439 B1, WO 2011/121822 A1 US 2011/268522 A1, DE 20 2005 020 088 U1, DE 10 2009 048 416 B3, the teaching of which is gear cutting machines, as well as to document EP 2 029 306 B1, which discloses a milling machine without a machining tool profiling device. Moreover, machine tools that conform to their genre are disclosed in documents JP 2002-103139 A, US 2003113177 A1, U.S. Pat. No. 4,961,289 A, US 2010/304642 A1, US 2012/225614 A1 and US 2009/227182.

JP 2002-103139 A discloses a machine tool for the production of profiles on a workpiece by means of a rotorically driven machining tool by generating or profile grinding, having a machine bed that has at least one workpiece receiving device that can be rotated around an axis of rotation for tightening the workpiece, and a workpiece machining device for machining the workpiece, which holds and drives the machining tool, wherein the workpiece receiving device is arranged as stationary on the machine bed. The workpiece machining device is borne by a machine base, which has a radial carriage that can be displaced radially perpendicular to the axis of rotation of the workpiece receiving device, and a displaceable lifting carriage arranged on the radial carriage, on which a rotational carriage that can be rotated with respect to the lifting carriage is arranged. The rotational carriage bears the workpiece machining device rotatably. The axis of rotation of the rotational carriage extends perpendicular to the axis of rotation of the workpiece receiving device. The machine base has a load-bearing sliding carriage that can be moved towards the radial carriage and the machine bed has a machine base linear dual guide for the sliding carriage, which moveably guides the machine base in the expansion direction of the axis of rotation of the workpiece receiving device along the rotatable workpiece receiving device The teaching of US 2003/113177 A1 is a method of machining essentially cylindrical gear wheels with internal or external gearing, wherein the workpiece is not exactly aligned on the processing machine, so wherein the wheel guiding axis, which later forms an axis of rotation in the gearing unit, does not coincide with the axis of rotation on the processing machine and thus, in the case of a rotary table or rotating workpiece spindle, tilts the wheel guiding axis around the axis of rotation, wherein the position of the wheel guiding axis is determined relative to the axis of rotation of the processing machine and the gearing is generated around the wheel guiding axis. The machine tool used for this has a base that consists of a table bottom part and a stand bottom part, on which a radial carriage can be displaced in the X direction. The radial carriage has an axial carriage that can be displaced in the Z direction. A swivel head is located on the axial carriage, which can be rotated around an axis A. The swivel head bears a machining tool with a corresponding drive, with which the tool can be rotated around its axis of rotation. The tool can be displaced in the direction of its axis, so in the Y direction. The table is located on the table bottom part, which table can be rotated around the C axis and on which the workpiece to be machined is received.

U.S. Pat. No. 4,961,289 A describes a machine tool for fine machining the tooth flanks of pre-toothed gearwheels, having a tool spindle that supports a grinding worm and that can be rotatably driven by rolling coupling with the workpiece carrier, which spindle is mounted in a workpiece carriage arrangement that can be moved back and forth, by means of which a working stroke and a return stroke connected thereto can be assigned to the grinding worm with respect to the workpiece. The machine tool provided for the machining is a continuously operating generating grinding machine, which is equipped with a grinding worm as a tool. The method that is also described as screw generating grinding is identical to known generating milling. A stationary workpiece table is located on the machine bed, on which a pre-toothed gear wheel is clamped with a suitable clamping means with a vertical axis. The workpiece can be rotated around its vertical axis to enter into rolling coupling with the tool worm. A radially displaceable main stand bears a tangential slide for tangentially displacing the tool worm. The tangential slide can furthermore be moved axially and swivelled around a horizontal axis. On the tool slide or tangential slide, a grinding worm is firmly clamped before a polishing worm on the tool spindle.

US 2010/304642 A1 relates to a gear cutting machine for the grinding of external profiles and/or internal profiles of workpieces, having at least one machining head which can be rotated around an axis and which has a grinding tool, and having a dressing unit. The dressing unit is supported in the region of the pivot axis of the machining head such that it is pivotable around the common pivot axis together with the machining head and such that it can be moved along the pivot axis towards the grinding tool to be dressed. A swivel bearing is arranged in the machine stand for the pivoting of the machining head with the grinding tool, wherein the dressing unit is moveable in the region of the centre of rotation of this swivel bearing via an axial carriage along the pivot axis.

US 2012/225614 A1 discloses a gear grinding machine with improved maintainability, which has a rotating grinding wheel with a thread added to it to grind a workpiece to be machined. The grinding wheel can be moved between a dressing position, in which the grinding wheel can be dressed on a dressing station, and a retreat position in which the grinding wheel processes the workpiece. The dressing station is arranged for rotation around an axis of rotation on a machine bed with a space alongside it, wherein the workpiece receiving device is arranged as stationary and the workpiece machining device is arranged to move in the X, Y and Z direction on the machine bed. The workpiece machining device is arranged on a machine base, which has a radial carriage that is displaceable radially perpendicular to the axis of rotation of the workplace receiving device, and a displaceable lifting carriage arranged on the radial carriage parallel to the axis of rotation of the workpiece receiving device, on which lifting carriage a rotatable rotational carriage is arranged opposite the lifting carriage, which bears the workpiece machining device rotatably.

The teaching of US 2009/227182 is a method for operating a gear grinding machine. The used machine tool has a workpiece fixture for a workpiece to be machined, which can be rotated around an axis of rotation, as well as a driven work spindle for clamping tools. The work spindle can be displaced into rotation motorically, wherein the axis of rotation of the work spindle can be swivelled in a plane that runs parallel to the axis of rotation of the workpiece fixture. For this, the work spindle can be swivelled around a swivel axis, which is perpendicular to the plane in which the axis of rotation of the work spindle extends, and which also extends perpendicular to the axis of rotation of the workpiece fixture. The work spindle can be shifted linearly in the direction of its axis of rotation. Furthermore, the work spindle can be moved linearly in a direction parallel to the axis of rotation of the work spindle and in a direction perpendicular to the axis of rotation of the workpiece fixture, in order to move the grinding tool clamped into the work spindle towards the workpiece clamped into the workpiece fixture or to move it away from the same.

SUMMARY OF THE INVENTION

Based on this, the object of the invention is to propose a machine tool that conforms to its genre for the production of profiles, wherein the disadvantages that are known from the prior art and described above are avoided, in addition, there should be consideration of the possibility to integrate any number of workpiece receiving devices, machining tool profiling devices and machine bases with a workpiece machining device into the machine bed, without more, more complicated and more expensive constructions being necessary than in the case of a workpiece machine having only one workpiece receiving device, a machining tool profiling device and a machine base with a workpiece machining device.

This object is solved according to the invention by a machine tool for the production of gearing systems having the features of claim 1. Further advantageous embodiments are to be gleaned from the subordinate claims thereto.

Then, in the case of the machine tool according to the invention, which has a machine bed with a machine base linear dual guide, which moveably guides the machine base tangentially opposite the workpiece arranged on the workpiece receiving device along the workpiece receiving device and the machining tool profiling device, the sliding carriage is designed as a tangential carriage, which is moveably guided vertically tangentially traverse along the workpiece receiving device by the machine base linear dual guide and perpendicular with respect to the axis of rotation. Here, the lifting carriage arranged on the radial carriage can be displaced parallel to the axis of rotation of the workpiece receiving device, wherein a machining tool profiling device is arranged on the machine bed, which has a dressing tool for the periodic dressing of the machine tool. The machining tool profiling device is arranged laterally, in the expansion direction of the machine base linear dual guide, alongside the workpiece receiving device with a space thereto, wherein the machine base linear dual guide has a length that corresponds at least to the lateral space between the machining tool profiling device and the workpiece receiving device.

The machine base is displaceably controlled along the machine base linear dual guide by means of the tangential carriage. The tangential carriage adjustably bears the radial carriage perpendicular to the machine base linear dual guide. Thus the workpiece machining device and the machining tool that is received rotatably and driven thereby can be positioned in any way in all three spatial directions over the tangential, radial and lifting carriage opposite the workpiece receiving device. The three carriages define three motion axes of the machine base, which form an X-Y-Z orthogonal system.

Optionally, a machining tool profiling device can be arranged on the machining tool on the machine bed, which has a dressing tool for the periodic dressing of the machine tool. Such a machining tool profiling device is not provided in pure tool milling machines, but rather is present in pure tool grinding machines or combined tool grinding/milling machines.

Here, the angle of approach of the machining tool with respect to the aligning tool can be adjusted via the rotational carriage of the lifting carriage for the dressing according to need. The machining tool can be moved in the X, Y and Z direction relative to the dressing tool, independently of the angle of approach. The machining tool profiling device thus does not require its own motion axis for the dressing tool in the corresponding directions. The stationary machining tool profiling device without an axis of motion enables a cost-effective production of this embodiment. It is obvious that the machine base linear dual guide has a length that corresponds at least to the lateral distance between the machining tool profiling device and the workpiece receiving device. Ideally, however, it is embodied to be considerably longer. A further advantage is that, for the dressing of the machining tool, with the aid of the dressing tool, both motion axes of the radial carriage and the lifting carriage, which are present anyway, can be used in an unchanged manner, such that, according to the invention, no additional motion axis is required. For this purpose, the shifted third motion axis of the workpiece machining device, which is formed by the machine base linear dual guide and the tangential carriage, can be used as the third motion axis. This simplifies the construction of the recently proposed machine tool and thus leads to cheaper production costs and to a very stiff construction.

The machining tool profiling device, which is provided laterally alongside the workpiece receiving device and at a distance therefrom, is preferably arranged at the same height as the workpiece that is to be machined. Ideally, in a preferred embodiment of the invention, the machining tool profiling device and the workpiece receiving device are thus arranged with the same level of separation to the machine base linear dual guide. Thus the radial carriage of the machine base can supply the machining tool quickly and unproblematically to the dressing tool for the dressing process.

In a preferred embodiment of the machine tool according to the invention, the at least one machining tool profiling device is arranged between two workpiece receiving devices. In this case, the machine base linear dual guide extends, with a length that is naturally at least in accordance with the distance to both workpiece receiving devices, parallel to these. The moveably guided machine base that supports the workpiece machining device can thus, in an exchangeable manner, be positioned directly opposite the respective workpiece receiving device with the tightened workpiece for machining the workpiece, and opposite the machining tool profiling device for dressing the machining tool. During the machining of the workpiece on one of the workpiece receiving devices, a setup process can take place on the other workpiece receiving device at the same time. This enables an interruption-free operation of the machine tool. Thus it is not absolutely necessary for the machining tool profiling device to be arranged between both workpiece receiving devices. Instead, it can be positioned on the machine bed to the right or left-hand side of both workpiece receiving devices.

According to the invention, the movement of the machining tool for helical gearing takes place transverse with the axis of rotation of the workpiece receiving device, preferably by moving the tangential carriage along the machine base linear dual guide and along the lifting carriage that is borne by the radial carriage, perpendicular to the tangential and radial carriage. The machining movement of the machining tool is thus effected by corresponding control of the tangential and lifting carriage in order to perform all potential helix angles of the gearing for a workpiece, as well as the respective gradient angle of the machining tool, on the workpiece.

In general terms, any number of workpiece receiving devices having one or more machining tool profiling devices positioned next to them, and also any number of machine bases having a respective workpiece machining device, can be arranged on the machine bed of the machine tool according to the invention. In this case, it is important that the at least two workpiece receiving devices and the at least one machining tool profiling device form a row that extends parallel to the machine base linear dual guide, on which all present machine bases with their workpiece machining devices are arranged with longitudinal displacement opposite the row. It therefore goes without saying that the machine base linear dual guide has a length that enables a displacement of all provided machine bases towards each of the present workpiece receiving devices or machining tool profiling devices. Furthermore, the at least one workpiece machining device can fundamentally bear and drive several machining tools and the at least one tool profiling device can also have more than one dressing tool.

Thus the object of the invention is achieved to propose a machine tool wherein one or more machining tool profiling devices and/or one or more workpiece receiving devices, in connection with one or more bases, are integrated into the machine without additional rotary tables or any other type of elaborate mechanics, in a very simple, stable and cost-effective manner. In such a machine tool, any number of workpiece receiving devices, machining tool profiling devices and machine bases with the workpiece machining device can be integrated into the machine bed alongside one another by means of the tangential carriage and the machine base linear dual guide, said workpiece machining device only being able to be started by elongating the machine base linear dual guide in the Y axis without additional machine axis and/or complicated, expensive constructions being necessary.

BRIEF DESCRIPTION OF THE DRAWINGS

The invention is illustrated in greater detail below using some of the exemplary embodiments depicted in the drawing. Further features of the invention also arise from the following description of the exemplary embodiments of the invention, in conjunction with the claims and the appended drawing. The individual features of the invention can, in this instance, be implemented individually or in combination in various embodiments of the invention. Here are shown:

DETAILED DESCRIPTION OF THE PREFERRED EMBODIMENTS

Figure 1:
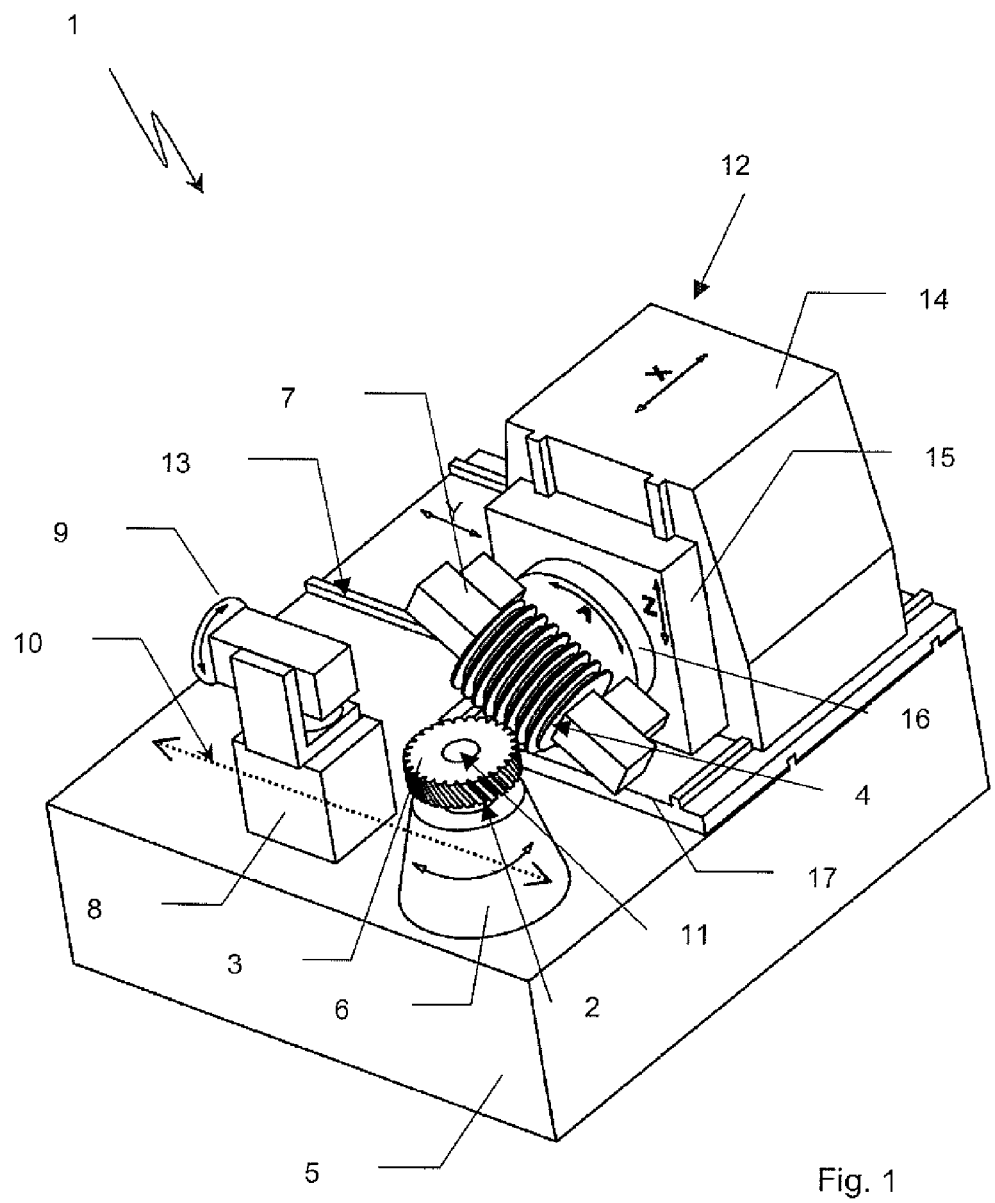
FIG. 1 a machine tool according to the invention, having a workpiece receiving device, a machining tool profiling device and a machine base with a workpiece machining device.

FIG. 1 shows, in a perspective depiction, a first exemplary embodiment of the machine tool 1 according to the invention for the production of gearing systems 2 on a workpiece 3 by means of a rotorically driven machining tool 4, by generating grinding, profile grinding or generating milling. The machine tool 1 has a machine bed 5, on which a workpiece receiving device 6 is arranged for tightening and rotating the workpiece 3, as well as a workpiece machining device 7 for machining the workpiece 3 received by the workpiece receiving device 6. The workpiece machining device 7 bears and drives the machining tool 4 for the workpiece 3. A machining tool profiling device 8 is arranged to the left alongside the workpiece receiving device 6 with the workpiece 3, said profiling device having a dressing tool 9 for the periodic dressing and profiling of the machining tool 4. The workpiece receiving device 6 and the machining tool profiling device 8 form a row 10.

The workpiece receiving device 6 and the machining tool profiling device 8 are separated from each other laterally and are fastened to the machine bed 5 so as to be stationary. The dressing tool 9 is incorporated into a motor-driven rotating shaft, which cannot be seen in the figure and which extends in the longitudinal direction of the row 10. The workpiece receiving device 6 has a central axis of rotation 11, which is aligned with the machine bed 5 in an orthogonal manner, wherein the workpiece receiving device 6 bears the workpiece 3 that is to be machined in a rotatable manner around the axis of rotation 11. The workpiece machining device 7 is arranged on a machine base 12, which is positioned in the transverse direction of the row 10 in the depicted machining position for the tool 3, directly alongside the workpiece receiving device 6 with radial separation to the workpiece receiving device 6. The machine base 12 can be moved on a machine base linear dual guide 13, which runs parallel to the row 10 that is determined by the workpiece receiving device 6 and the machining tool profiling device 8, in the longitudinal direction of the row 10 from the workpiece receiving device 6 to the machining tool profiling device 8, and vice versa.

Figure 2:
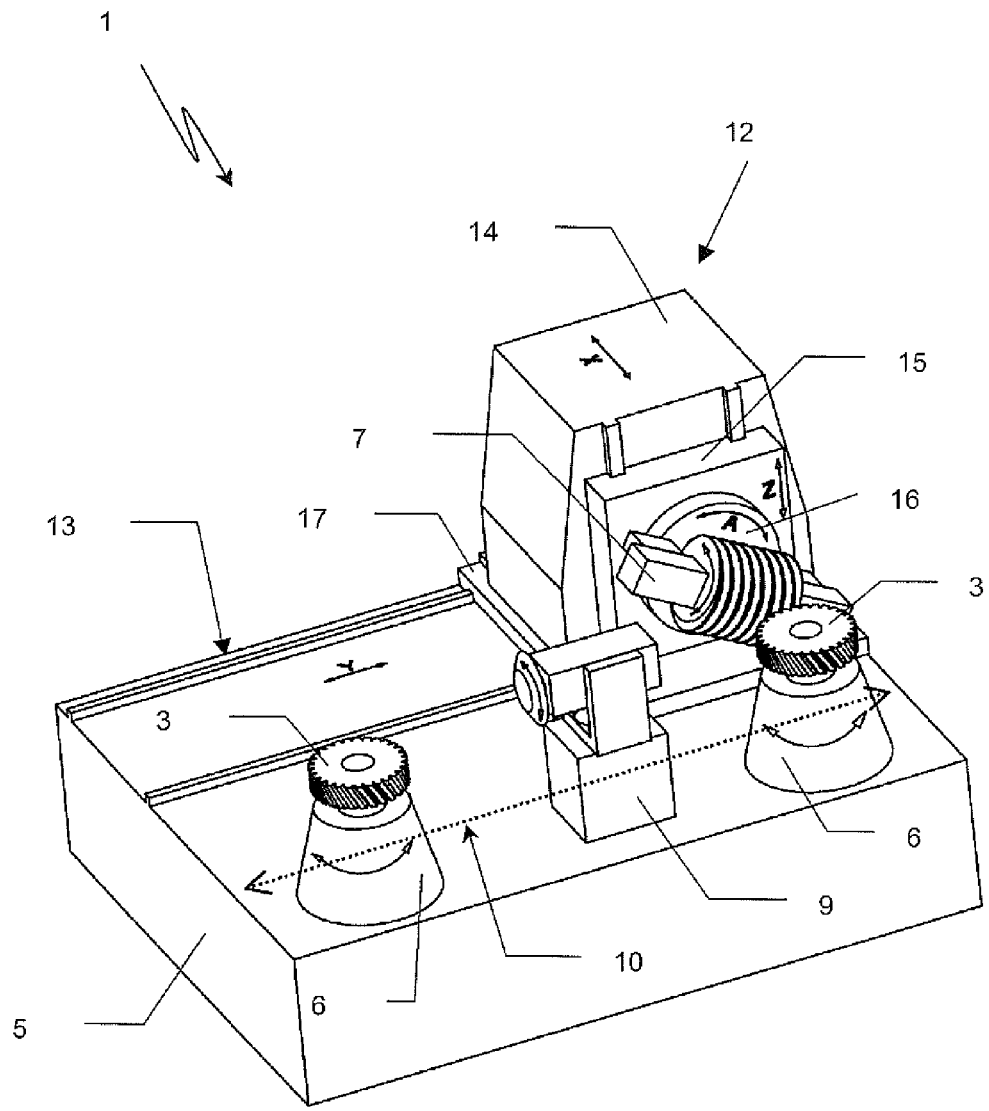
FIG. 2 a machine tool according to the invention, having two workpiece receiving devices, a machining tool profiling device arranged between the workpiece receiving devices, and a machine base with a workpiece machining device.

The machine base 12 has a radial carriage 14, which can be moved in a radial manner vertically opposite the axis of rotation 11 of the workpiece receiving device 6 to the workpiece receiving device 6 and thus to the workpiece 3, and vice versa. The radial carriage 14 bears a lifting carriage 15, which can be moved upwards away from the machine bed 5, and in the opposite direction, parallel to the axis of rotation 11 of the workpiece receiving device 6. The lifting carriage 15 in turn bears a rotational carriage 16, on which the workpiece machining device 7 is arranged rotatably with the machining tool 4 with horizontal inclination. The radial carriage 14 is, for its part, mounted moveably on a tangential carriage 17, which is guided moveably by the machine base linear dual guide 13 along the row 10. The motion axes X, Y, Z of the radial carriage 14, the tangential carriage 17 and the lifting carriage 15 form a Cartesian system. With a coordinated movement of the carriages 14, 15, 17, the machining tool 4, whose angle of inclination with respect to the machine bed 5 and the machine base 12 can be adjusted to any value by rotating the rotational carriage 16 in the peripheral direction A, can be guided, with respect to the workpiece 3 and the dressing tool 9, in any desired direction or along a course that can be determined, in order to machine the workpiece 3 or dress the machining tool 9. FIG. 2 shows a further embodiment of the machine tool 1 according to the invention, having two workpiece receiving devices, a machining tool profiling device 8 and a machine base 12 with a workpiece machining device 7. Here, the machining tool profiling device 8 is arranged between both workpiece receiving devices 6. Both workpiece receiving devices 6 and the machining tool profiling device 8 are formed according to the exemplary embodiment of the machine tool according to the invention depicted in FIG. 1 and described above. These in turn form a row 10, parallel to which the machine base linear dual guide 13, which moveably bears the machine base 12, extends with lateral separation. The machine base 12 itself is also formed in an identical manner to the first exemplary embodiment, with a tangential carriage 17, a radial carriage 14, a lifting carriage 15 and a rotational carriage 16. Both workpieces 3 on the two workpiece receiving devices 6 are machined one after the other in an exchangeable manner by means of the workpiece machining device 7, with the machining tool 4, arranged on the rotational carriage 16 of the machine base 12. The machining tool profiling device 8 is used, if required, depending on which of the two workpieces 3 are being machined, or are to be machined, by means of the machine tool 4.

Figure 3:
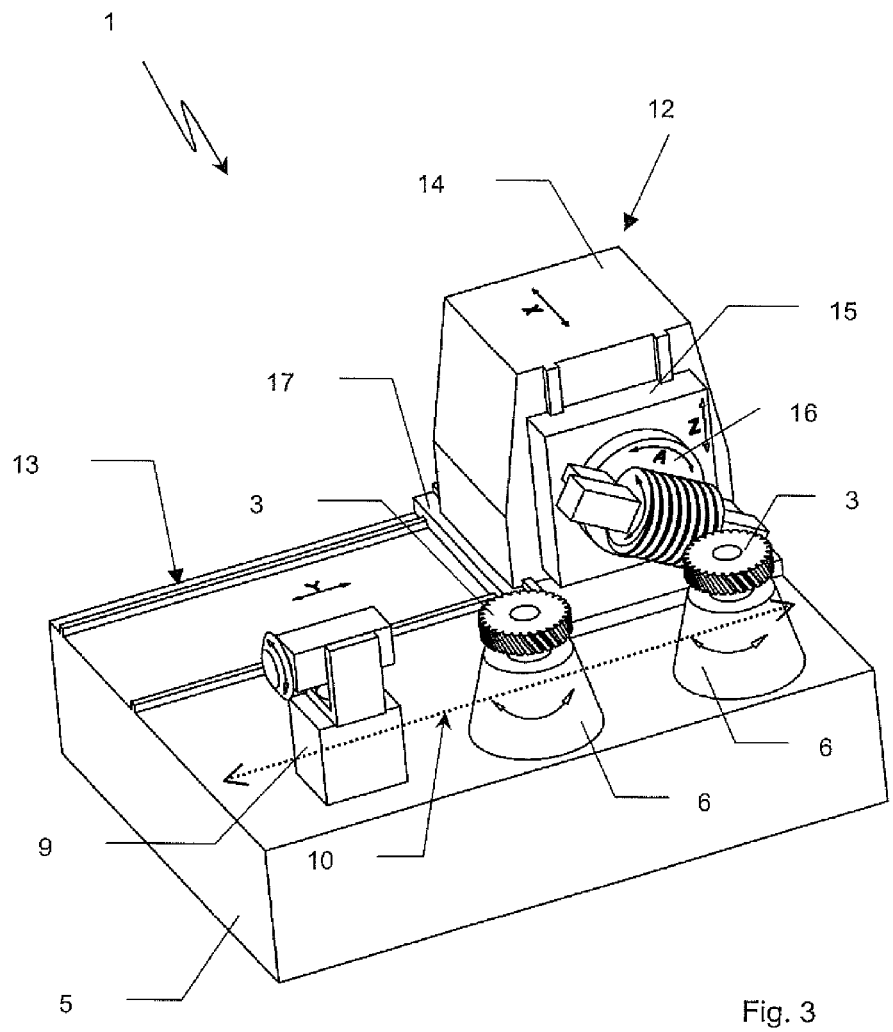
FIG. 3 a machine tool according to the invention, having two workpiece receiving devices, a machining tool profiling device arranged to the left of both workpiece receiving devices, and a machine base with a workpiece machining device.

FIG. 3 shows a variation of the second exemplary embodiment, which is depicted in FIG. 2, of the invention as a further exemplary embodiment. In this case, both workpiece receiving devices 6 are arranged directly adjacent to each other, wherein the machining tool profiling device 8 is positioned on the side facing away from the other workpiece receiving device 6 on the outside next to the left-hand workpiece receiving devices 6. The other construction of this machine tool 1 does not differ from the second exemplary embodiment of the invention, which is described above.

FIG. 1 shows the invention as an example of a gear cutting machine 1, which machines the workpiece 3 by generating grinding and profile grinding on their own or combined with generating milling and profile milling, and in accordance with a machining tool profiling device 8. This is naturally not necessary for profiling machines that machine the workpiece 3 by generating milling and profile milling alone A machine tool 1 according to the invention for the production of profiles 2 on the workpiece 3 by means of a rotorically driven machining tool 4 by generating milling and/or profile milling is not depicted in the appended drawing. It does, however, arise in an obvious manner by the machining tool profiling device 8 being removed from FIG. 1.

The invention claimed is:

1. A machine tool for the production of profiles on a workpiece by means of a rotorically driven machining tool by one of generating grinding and profile grinding, or by one of generating grinding and profile grinding in combination with at least one of generating milling and profile milling, the machine tool comprising:
   a machine bed, which has a workpiece receiving device that can be rotated around an axis of rotation and that bears the workpiece, and
   a workpiece machining device for machining the workpiece, which holds and drives the machining tool, wherein the workpiece receiving device is fastened on the machine bed so as to be stationary, and the workpiece machining device is arranged moveably on the machine bed, and wherein the workpiece machining device is borne by a machine base, which machine base has a radial carriage that can be moved in an X-direction radially perpendicular to the axis of rotation of the workpiece receiving device, and a lifting carriage arranged on the radial carriage, which lifting carriage is movable in a Z-direction parallel to the axis of rotation of the workpiece receiving device, on which lifting carriage a rotational carriage that can be rotated with respect to the lifting carriage is arranged, which rotational carriage extends parallel to the axis of rotation of the workpiece receiving device and which bears the workpiece machining device rotatably, wherein the machine base has a sliding carriage that displaceably bears the radial carriage and the machine bed has a machine base linear dual guide for the sliding carriage, wherein the machine base linear dual guide extends in a Y-direction that is perpendicular to the axis of rotation of the workpiece receiving device, and guides the machine base moveably in the Y-direction with respect to the workpiece receiving device, wherein the sliding carriage is formed as a tangential carriage, which tangential carriage is guided with perpendicular and tangentially transverse displacement in the Y-direction with respect to the axis of rotation along the workpiece receiving device by the machine base linear dual guide, and a machining tool profiling device is immovably arranged on and fastened on the machine bed so as to be fixed from movement, and the machining tool profiling device has a dressing tool, which is mounted to a motor-driven rotating shaft, for dressing the machining tool, wherein in dressing the machining tool, the machining tool moves in the X, Y and Z-directions relative to the dressing tool, and the machining tool profiling device does not have its own motion axes for the dressing tool in corresponding directions, and wherein the machining tool profiling device is arranged alongside the workpiece receiving device with a lateral separation in the Y-direction, and wherein the machine base linear dual guide has a length in the Y-direction that corresponds to at least that of the lateral separation between the machining tool profiling device and the workpiece receiving device.

2. The machine tool according to claim 1, characterized in that the machining tool profiling device is arranged at a height that is the same as that of the workpiece to be machined.

3. The machine tool according to claim 2, characterized in that the machining tool profiling device and the workpiece receiving device are arranged at respective distances from the machine base dual linear guide that are the same.

4. The machine tool according to claim 3, characterized in that at least one further workpiece receiving device is arranged on the machine bed.

5. The machine tool according to claim 4, characterized in that the machining tool profiling device is arranged between the workpiece receiving device and the at least one further workpiece receiving device.

6. The machine tool according to claim 2, characterized in that at least one further workpiece receiving device is arranged on the machine bed.

7. The machine tool according to claim 6, characterized in that the machining tool profiling device is arranged between the workpiece receiving device and the at least one further workpiece receiving device.

8. The machine tool according to claim 1, characterized in that the machining tool profiling device and the workpiece receiving device are arranged at respective distances from the machine base dual linear guide that are the same.

9. The machine tool according to claim 8, characterized in that at least one further workpiece receiving device is arranged on the machine bed.

10. The machine tool according to claim 9, characterized in that the machining tool profiling device is arranged between the workpiece receiving device and the at least one further workpiece receiving device.

11. The machine tool according to claim 1, characterized in that at least one further workpiece receiving device is arranged on the machine bed.

12. The machine tool according to claim 11, characterized in that the machining tool profiling device is arranged between the workpiece receiving device and the at least one further workpiece receiving device.

13. The machine tool according to claim 1, characterized in that movement of the machining tool for production of a helical gear takes place in such a way that the tangential carriage moves along the machine base linear dual guide and the lifting carriage moves perpendicular to the radial carriage.

14. The machine tool according to claim 1, characterized in that the workpiece machining device is configured to produce a gearing system on the workpiece, and the dressing tool is rotatable with respect to a first end of the machining tool profiling device.

15. The machine tool according to claim 1, characterized in that the workpiece machining device is configured to produce a gearing system on the workpiece, and the workpiece receiving device and the machining tool profiling device define a row that is parallel to the Y-direction in which the machine base linear dual guide extends, and wherein the dressing tool is rotatable with respect to a first end of the machining tool profiling device.

16. The machine tool according to claim 15, characterized in that at least one further workpiece receiving device is fastened on the machine bed so as to be stationary, wherein the workpiece receiving device, the at least one further workpiece receiving device, and the machining tool profiling device define the row.

* * * * *